(12) United States Patent
Zhao et al.

(10) Patent No.: US 9,975,150 B2
(45) Date of Patent: May 22, 2018

(54) CLEANING DEVICE

(71) Applicant: BOE TECHNOLOGY GROUP CO., LTD., Beijing (CN)

(72) Inventors: Hui Zhao, Beijing (CN); Qiang Wei, Beijing (CN); Xuewen Lv, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 232 days.

(21) Appl. No.: 14/443,578

(22) PCT Filed: Apr. 21, 2015

(86) PCT No.: PCT/CN2015/077035
§ 371 (c)(1),
(2) Date: May 18, 2015

(87) PCT Pub. No.: WO2016/045372
PCT Pub. Date: Mar. 31, 2016

(65) Prior Publication Data
US 2016/0256885 A1 Sep. 8, 2016

(30) Foreign Application Priority Data
Sep. 23, 2014 (CN) .................... 2014 2 0549334 U

(51) Int. Cl.
*B08B 3/02* (2006.01)
*B05B 1/32* (2006.01)
(Continued)

(52) U.S. Cl.
CPC ................. *B08B 3/02* (2013.01); *A47K 7/00* (2013.01); *B05B 1/3093* (2013.01); *B05B 1/323* (2013.01);
(Continued)

(58) Field of Classification Search
CPC ...... A61H 33/00; B05B 1/3093; B05B 1/323; B08B 2203/0205; B08B 3/00; B08B 3/02; A47K 7/00; F16K 3/00; F16K 3/0218
(Continued)

(56) References Cited

U.S. PATENT DOCUMENTS 450,408 A * 4/1891 Franttini ................ B60G 17/04
280/6.157
3,570,805 A * 3/1971 Moran ...................... B63C 9/24
251/294
(Continued)

FOREIGN PATENT DOCUMENTS

CN 2307522 Y 2/1999
CN 201404926 Y 2/2010
(Continued)

OTHER PUBLICATIONS

IPRP dated Mar. 28, 2017; PCT/CN2015/077035.
International Search Report dated Jul. 23, 2015; PCT/CN2015/077035.

*Primary Examiner* — Joseph L. Perrin
*Assistant Examiner* — Kevin G Lee
(74) *Attorney, Agent, or Firm* — Ladas & Parry LLP; Loren K. Thompson

(57) ABSTRACT

A cleaning device, which includes a clean water tank, a water pump and a cleaning head. A water outlet of the clean water tank is connected with the water pump, and a water outlet of the water pump is connected with the cleaning head through an outlet pipe. The cleaning device further includes an outlet control switch and a one-way water hydraulic control valve. The outlet control switch is provided on the outlet pipe; a water inlet of the one-way water hydraulic control valve is connected with the outlet pipe, and a joint of the water inlet of the one-way water hydraulic control valve and the outlet pipe is disposed between the outlet control switch and the water pump; and a water outlet of the (Continued)

one-way water hydraulic control valve is communicated with a water inlet of the clean water tank.

18 Claims, 2 Drawing Sheets

(51) Int. Cl.
 *B08B 3/00* (2006.01)
 *B05B 1/30* (2006.01)
 *A47K 7/00* (2006.01)
 *A61H 33/00* (2006.01)
 *B05B 15/04* (2006.01)

(52) U.S. Cl.
 CPC ............... *B08B 3/00* (2013.01); *A61H 33/00* (2013.01); *B05B 15/0425* (2013.01); *B08B 2203/0205* (2013.01); *Y02P 70/36* (2015.11)

(58) Field of Classification Search
 USPC .................................................. 239/126, 167
 See application file for complete search history.

(56) References Cited

U.S. PATENT DOCUMENTS

| | | | | |
|---|---|---|---|---|
| 3,705,437 A | * | 12/1972 | Rukavina, Jr. | ............ A47L 5/38 |
| | | | | 134/183 |
| 7,401,593 B2 | * | 7/2008 | Rembold | ............ F02M 63/0036 |
| | | | | 123/446 |
| 8,496,188 B2 | * | 7/2013 | Linton | .................... B08B 3/026 |
| | | | | 137/563 |
| 2005/0098638 A1 | | 5/2005 | Hanna | |
| 2016/0256885 A1 | | 9/2016 | Zhao et al. | |

FOREIGN PATENT DOCUMENTS

| | | |
|---|---|---|
| CN | 102631160 A | 8/2012 |
| CN | 204092386 U | 1/2015 |
| DE | 4124605 A1 | 1/1993 |

\* cited by examiner

CLEANING DEVICE

TECHNICAL FIELD

The embodiments of the present invention relate to a cleaning device.

BACKGROUND

When a nurse nurses the body of a treated person, the nurse not only must clean the body but also must deal with the dirty water produced after cleaning. In this case, the labor intensity of the nurses is relatively large. Cleaning device, taken as an equipment capable of not only cleaning the body but also pumping the dirty water produced after cleaning back into the cleaning device, can greatly reduce the labor intensity of the nurses.

A cleaning device generally comprises a clean water tank, a water pump, an outlet pipe, a cleaning head, a waste water pipe and a waste water tank. The cleaning head includes a clean water outlet and a waste water collection port. When the cleaning device is required in operation, the cleaning head is allowed to make contact with skin and the water pump is started; the clean water in the clean water tank is pumped into the outlet pipe by the water pump, subsequently flows into the cleaning head, and is sprayed out through the clean water outlet to clean the skin; the waste water produced in cleaning is discharged into the waste water pipe through the waste water collection port and subsequently pumped into the waste water tank; and hence the functions of cleaning the body and pumping the dirty water produced after cleaning back into the cleaning device can be achieved. When the cleaning process is to be interrupted temporarily, the cleaning head is taken away from the skin. At this point, the water pump still continues pumping water, and the clean water entering the outlet pipe directly flows out from the clean water outlet of the cleaning head.

Thus, when the cleaning process is interrupted temporarily, the clean water directly flows out from the clean water outlet of the cleaning head and does not function any way, which results in a substantial waste of clean water and is also inconvenient for the user. As for some cleaning devices, clean water outlets are additionally provided with outlet control switches. After the outlet control switch is switched off, the clean water will not flow out from the clean water outlet of the cleaning head, but the clean water entering the outlet pipe will be directly pumped into the waste water pipe and enter the waste water tank. With the structure, the problem of a substantial waste of clean water cannot be solved. Moreover, due to the limitation of volume, the cleaning device can only store a limited amount of clean water. Therefore, the waste of clean water must be avoided as much as possible.

SUMMARY

Embodiments of the present invention provide a cleaning device, which can solve the problem of waste of clean water when the cleaning device is not used temporarily and achieve the reclamation and utilization of clean water.

An embodiment of the present invention provides a cleaning device, which comprises a clean water tank, a water pump and a cleaning head. A water outlet of the clean water tank is connected with the water pump, and a water outlet of the water pump is connected with the cleaning head through an outlet pipe. The cleaning device further comprises an outlet control switch and a one-way water hydraulic control valve. The outlet control switch is provided on the outlet pipe; a water inlet of the one-way water hydraulic control valve is connected with the outlet pipe, and a joint of the water inlet of the one-way water hydraulic control valve and the outlet pipe is disposed between the outlet control switch and the water pump; and a water outlet of the one-way water hydraulic control valve is communicated with a water inlet of the clean water tank.

For instance, the cleaning head may include a clean water outlet and a waste water collection port. The waste water collection port is connected with a waste water pipe which is connected with a waste water tank.

For instance, the water inlet of the one-way water hydraulic control valve is connected with the outlet pipe through a tee pipe coupling disposed between the outlet control switch and the water pump.

For instance, the one-way water hydraulic control valve includes a one-way valve inlet pipe, a one-way valve outlet pipe and a sealing hammer disposed in the one-way valve inlet pipe.

For instance, the water inlet of the one-way water hydraulic control valve is disposed at one end of the one-way valve inlet pipe, and the other end of the one-way valve inlet pipe is provided with an end wall; one end of the one-way valve outlet pipe is hermetically sleeved at one end of the one-way valve inlet pipe provided with the end wall, and the other end is provided with the water outlet of the one-way water hydraulic control valve; a cavity is formed between an outer wall of the one-way valve inlet pipe and an inner wall of the one-way valve outlet pipe; a leakage port communicated with the cavity is formed on a pipe wall of the inlet pipe; the sealing hammer is configured to slide along an inner wall of the one-way valve inlet pipe; an end surface of the sealing hammer is connected with the end wall of the one-way valve inlet pipe through a spring; and when the spring is in a free state, the sealing hammer completely seal the leakage port.

For instance, the sealing hammer includes a hammer head and a hammer handle; the hammer handle runs through the end wall of the one-way valve inlet pipe; the cross-sectional area of the hammer handle is less than that of the hammer head; both the cross-sectional area of the hammer handle and the cross-sectional area of the hammer head are the area of cross sections perpendicular to the longitudinal direction of the hammer handle; the spring is sleeved on the hammer handle; and one end of the spring is connected with the hammer head and the other end is connected with the end wall of the one-way valve inlet pipe.

For instance, the hammer head has a cylindrical structure; and the outer diameter of the hammer head is less than or equal to the inner diameter of the one-way valve inlet pipe.

For instance, an O-ring seal is sleeved on an outer wall of the hammer head and disposed between the outer wall of the hammer head and the inner wall of the one-way valve inlet pipe.

For instance, both the water inlet and the water outlet of the one-way water hydraulic control valve are provided with connecting threads.

BRIEF DESCRIPTION OF THE DRAWINGS

Simple description will be given below to the accompanying drawings required to be used in the description of the embodiments to provide a more clear understanding of the technical proposals of the embodiments of the present invention. Obviously, the drawings described below only involve some embodiments of the present invention. Other drawings may also be made by those skilled in the art without creative efforts on the basis of the accompanying drawings.

REFERENCE NUMERALS

1—clean water tank, 2—water pump, 3—outlet pipe, 4—cleaning head, 5—outlet control switch, 6—one-way water hydraulic control valve, 7—waste water pipe, 8—tee (T) pipe coupling, 61—one-way valve inlet pipe, 62—one-way valve outlet pipe, 63—sealing hammer, 64—spring, 65—seal, 611—leakage port, 631—hammer head, 632—hammer handle.

DETAILED DESCRIPTION

Clear and complete description will be given below to the technical proposals of the embodiments of the present invention with reference to the accompanying drawings of the embodiments of the present invention. Obviously, the preferred embodiments are only partial embodiments of the present invention but not all the embodiments. All the other embodiments obtained by those skilled in the art without creative efforts on the basis of the embodiments of the present invention illustrated shall fall within the scope of protection of the present invention.

In the description of the present invention, it should be understood that: the orientation or position relations indicated by the terms "center", "on", "beneath", "front", "rear", "left", "right", "vertical", "horizontal", "top", "bottom", "inside", "outside" and the like are the orientation or position relations based on the accompanying drawings, are only intended to illustrate the present invention and provide simple description and not intended to indicate or hint that the referred device or element must have specific orientations and be constructed and operated in specific orientations, and hence should not be construed as the limitation of the present invention. In addition, the terms "first" and "second" are only intended to describe the objective and should not be construed as the indication or hint of relative importance or the implicit indication of the number of the specified technical features. Thus, the technical feature defined by the terms "first" and "second" may explicitly or implicitly include one or more features.

Unless otherwise defined, the terms such as "mounted," "connected" and "connection" should be broadly understood, for instance, may refer to fixed connection and may also refer to detachable connection or integral connection; may refer to mechanical connection and may also refer to electrical connection; may refer to direct connection and may also refer to indirect connection through an intermediate; and may refer to the internal communication of two elements. The specific meanings of the above terms in the present invention may be understood by those skilled in the art according to specific conditions.

Figure 1:
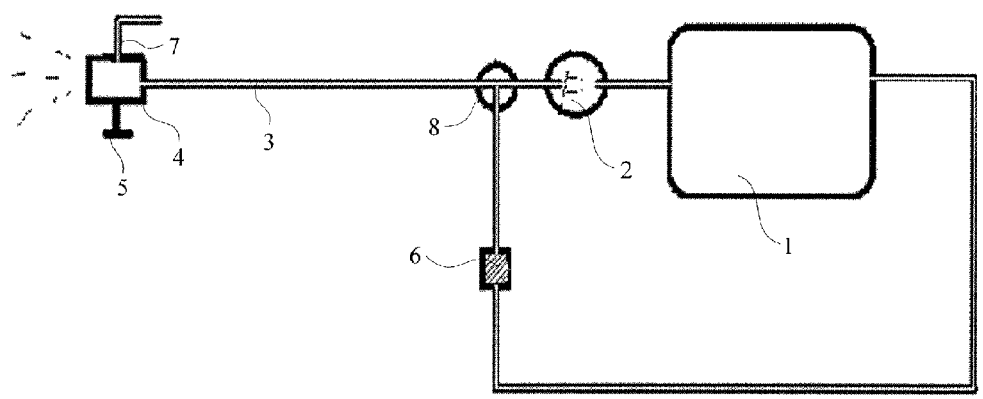
FIG. 1 is an overall schematic structural view of a cleaning device provided by an embodiment of the present invention.
Figure 2:
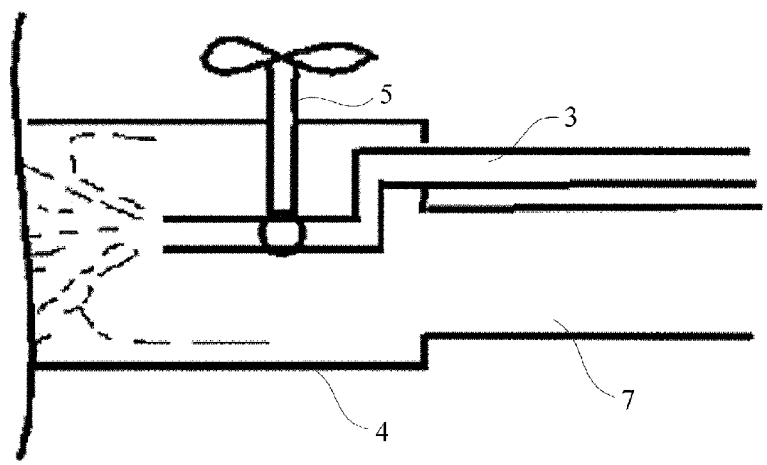
FIG. 2 is a schematic structural partial enlarged view of the cleaning device provided by an embodiment of the present invention.

FIGS. 1 and 2 illustrate one specific example of the cleaning device provided by the embodiment of the present invention. As illustrated in FIGS. 1 and 2, the cleaning device provided by the embodiment comprises a clean water tank 1. A water outlet of the clean water tank 1 is connected with a water pump 2, and a water outlet of the water pump 2 is connected with a cleaning head 4 through an outlet pipe 3. An outlet control switch 5 is provided on the outlet pipe 3. A one-way water hydraulic control valve 6 is connected between the clean water tank 1 and the outlet pipe 3. Specifically, a water inlet of the one-way hydraulic control valve 6 is connected with the outlet pipe 3, and the joint of the water inlet of the one-way hydraulic control valve 6 and the outlet pipe 3 is disposed between the outlet control switch 5 and the water pump 2; and a water outlet of the one-way hydraulic control valve 6 is communicated with a water inlet of the clean water tank 1.

The cleaning device provided by the embodiment of the present invention, for instance, may be used for body cleaning, vehicle cleaning, desktop cleaning, etc. The cleaning device comprises the outlet control switch 5 and the one-way water hydraulic control valve 6. The water inlet of the one-way water hydraulic control valve 6 is connected with the outlet pipe 3, and the water outlet of the one-way water hydraulic control valve 6 is communicated with the water inlet of the clean water tank 1. Before the cleaning device is used, the outlet control switch 5 is in the off-state. When the cleaning device is required in operation, the outlet control switch 5 has to be switched on at first. Taking skin cleaning as an example, the cleaning head 4 is allowed to make contact with skin and the water pump 2 is started; the clean water in the clean water tank 1 is pumped into the outlet pipe 3 by the water pump 2, subsequently flows into the cleaning head 4, and is subsequently sprayed out by the cleaning head 4 to clean the skin; and hence skin cleaning can be achieved. In the operation process, the clean water in the outlet pipe 3 is discharged immediately and not collected or aggregated. The pressure difference between the water inlet and the water outlet of the one-way water hydraulic control valve 6 is substantially zero, so that the one-way water hydraulic control valve 6 is in the off-state. When the cleaning process is to be interrupted temporarily, the cleaning head 4 is taken away from a cleaned object (the skin) and the outlet control switch 5 is switched off. At this point, the water pump 2 still continues pumping water and the clean water in the clean water tank 1 continues entering the outlet pipe 3. When the amount of clean water in the outlet pipe 3 is gradually increased, the water pressure of the water inlet of the one-way water hydraulic control valve 6 is gradually increased and the pressure difference between the water inlet and the water outlet of the one-way water hydraulic control valve 6 is gradually increased. When the pressure difference is raised to a predetermined pressure difference threshold, the one-way water hydraulic control valve 6 is turned on and the clean water in the outlet pipe 3 gradually flows into the one-way water hydraulic control valve 6 from the water inlet of the one-way water hydraulic control valve 6, flows out from the water outlet of the one-way water hydraulic control valve 6, and flows back into the clean water tank 1 from the water inlet of the clean water tank 1. Along with this process, the water pressure in the outlet pipe 3 is gradually decreased; the water pressure of the water inlet of the one-way water hydraulic control valve 6 is also gradually decreased; and the pressure difference between the water inlet and the water outlet of the one-way water hydraulic control valve 6 is gradually decreased. When the pressure difference is decreased to the predetermined pressure difference threshold, the one-way water hydraulic control valve 6 is turned off. In this way, a new cycle of clean water collection and release is restarted in the outlet pipe 3. In the process, excessive clean water flows back into the clean water tank 1 automatically. Therefore, the reclamation and utilization of clean water can be achieved and a substantial waste of clean water can be avoided. When the cleaning device is to be operated once more, the cleaning head 4 makes contact with the skin. Because water in the outlet pipe 3 maintains a certain pressure, the clean water will be sprayed out from the cleaning head 4 at the moment when the outlet control switch 5 is switched on, and hence the water discharging delay in the switch-on process can be effectively avoided.

In order to reduce the labor intensity of users, the cleaning device not only has the function of cleaning a body but also preferably has the function of, for instance, pumping dirty water produced after cleaning back into the cleaning device. For this reason, the cleaning head 4, for instance, includes a clean water outlet and a waste water collection port. The waste water collection port is connected with a waste water pipe 7 which is connected with a waste water tank (not shown in the figure). In the use process of the cleaning device, the cleaning head 4 is allowed to make contact with the skin and the water pump 2 is started; the clean water in the clean water tank 1 is pumped into the outlet pipe by the water pump 2, subsequently flows into the cleaning head 4, and is subsequently sprayed out from the clean water outlet to clean the skin; and the waste water produced after cleaning is discharged into the waste water pipe 7 through the waste water collection port and subsequently pumped into the waste water tank. Therefore, the cleaning device can simultaneously achieve the functions of cleaning the body and pumping the dirty water produced after cleaning back into the cleaning device, does not need to separately execute two processes, namely body cleaning and washed dirty water treatment, and hence reduces the labor intensity of users.

The water inlet of the one-way water hydraulic control valve 6 is connected with the outlet pipe 3 through a tee (T) pipe coupling 8 disposed between the outlet control switch 5 and the water pump 2. The clean water in the water pump 2 flows into a water pipe connected with one pipe connector of the tee pipe coupling 8 close to the clean water tank 1 and flows out from the water inlet of the one-way water hydraulic control valve 6 and the outlet pipe 3, so that the water pressure of the water inlet of the one-way water hydraulic control valve 6 and the water pressure of the outlet pipe 3 are guaranteed to be consistent. Therefore, when the water pressure of the outlet pipe 3 is increased, the water pressure of the water inlet of the one-way water hydraulic control valve 6 is also increased. When the pressure difference between the water inlet and the water outlet of the one-way water hydraulic control valve 6 exceeds the predetermined threshold, the one-way water hydraulic control valve 6 is turned on. When the water pressure of the outlet pipe 3 is decreased, the water pressure of the water inlet of the one-way water hydraulic control valve 6 is also decreased. When the pressure difference between the water inlet and the water outlet of the one-way water hydraulic control valve 6 is less than the predetermined threshold, the one-way water hydraulic control valve 6 is turned off.

Figure 3:
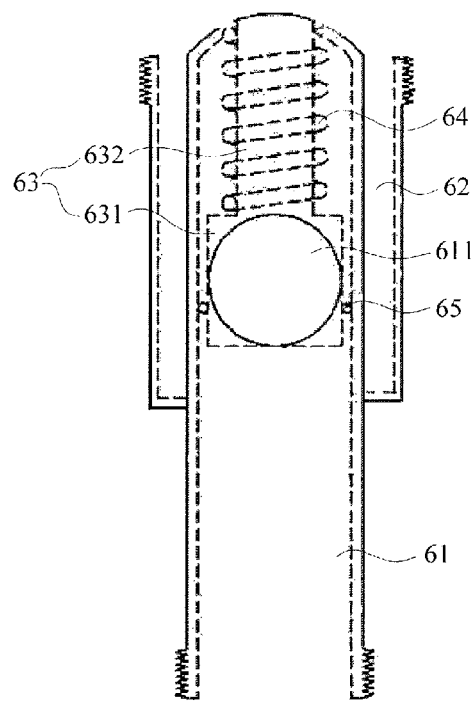
FIG. 3 is a schematic diagram of the cleaning device provided by an embodiment of the present invention in which a one-way water hydraulic control valve is in an off-state.
Figure 4:
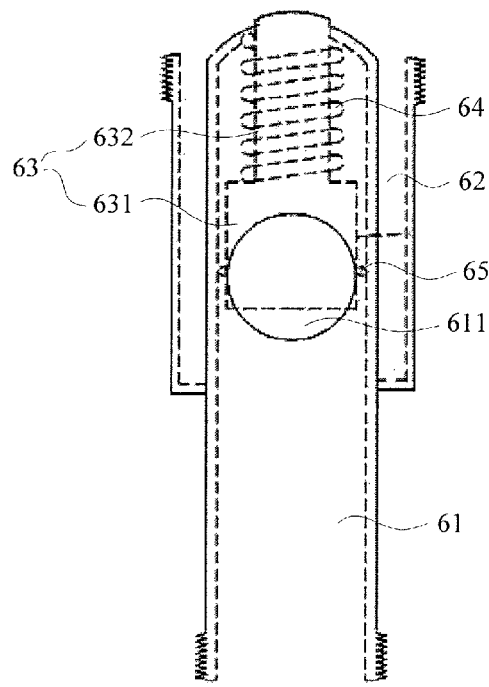
FIG. 4 is a schematic diagram of the cleaning device provided by the embodiment of the present invention in which the one-way water hydraulic control valve is in the on-state.

As illustrated in FIGS. 3 and 4, one example of the one-way water hydraulic control valve 6 includes a one-way valve inlet pipe 61, a one-way valve outlet pipe 62 and a sealing hammer 63 disposed within the one-way valve inlet pipe 61. The water inlet of the one-way water hydraulic control valve 6 is formed at one end of the one-way valve inlet pipe 61, the other end of which is provided an end wall. One end of the one-way water hydraulic control valve 6 is hermetically sleeved at one end of the one-way valve inlet pipe 61 provided with the end wall, and the other end of the valve is provided with the water outlet of the one-way water hydraulic control valve 6. A cavity is formed between an outer wall of the one-way valve inlet pipe 61 and an inner wall of the one-way valve outlet pipe 62. A leakage port 611 communicated with the cavity is formed on the pipe wall of the one-way inlet pipe 61. The sealing hammer may slide along an inner wall of the one-way valve inlet pipe 61. An end surface of the sealing hammer 63 is connected with the end wall of the one-way valve inlet pipe 61 through a spring 64. When the spring 64 is in a free state, the sealing hammer 63 may completely seal the leakage port 611.

In the use process of the cleaning device, the pressure difference between the water inlet and the water outlet of the one-way water hydraulic control valve 6 is substantially zero. At this point, the sealing hammer 63 is fixed at a specific position under the action of the spring 64. At this position, the sealing hammer 63 can seal the leakage port 611, and the one-way water hydraulic control valve 6 is in the off-state. When the cleaning process is interrupted temporarily, the water pump 2 still continues pumping water; the pressure of the water inlet of the one-way water hydraulic control valve 6 is gradually increased; and the pressure difference between the water inlet and the water outlet of the one-way water hydraulic control valve 6 is gradually increased. When the pressure difference is raised to the predetermined pressure difference threshold, the sealing hammer 63 is forced to overcome the elastic force of the spring 64 and move towards the end wall of the one-way valve inlet pipe 61 along the inner wall of the one-way valve inlet pipe 61. The sealing hammer 63 is moved away to the position at which the sealing hammer 63 cannot completely seal the leakage port 611, and a passage is formed between the one-way valve inlet pipe 61 and the one-way valve outlet pipe 62. At this point, the one-way water hydraulic control valve 6 is in the on-state, and clean water gradually flows into the one-way water hydraulic control valve 6 from the water inlet of the one-way water hydraulic control valve 6, flows out from the water outlet of the one-way water hydraulic control valve 6, and flows back into the clean water tank 1 from the water inlet of the clean water tank 1. The water pressure in the outlet pipe 3 begins to be gradually decreased, and the pressure difference between the water inlet and the water outlet of the one-way water hydraulic control valve 6 is gradually decreased. When the pressure difference is decreased to the predetermined pressure difference threshold, the one-way water hydraulic control valve 6 is turned off. Due to the arrangement of the one-way water hydraulic control valve 6, excessive clean water flows back into the clean water tank 1 automatically. Moreover, the water in the outlet pipe 3 is maintained at a certain pressure. Therefore, the cleaning device not only can achieve the reclamation and utilization of clean water and avoid a substantial waste of clean water but also can effectively avoid outlet delay in the recovery use process.

In order to ensure the stability of the spring 64 when it is pressed, the sealing hammer 63, for instance, includes a hammer head 631 and a hammer handle 632. The hammer head 631 can completely seal the leakage port 611 to achieve the off-state of the one-way water hydraulic control valve or may not completely seal the port to achieve the on-state of the one-way water hydraulic control valve. The hammer handle 632 runs through the end wall of the one-way valve inlet pipe 61, and the cross-sectional area of the hammer handle 632 is less than that of the hammer head 631. Here, both the cross-sectional area of the hammer handle 632 and the cross-sectional area of the hammer head 631 refer to the area of cross sections perpendicular to the longitudinal direction of the hammer handle 632. Thus, the spring 64 is sleeved on the hammer handle 632; and one end of the spring 64 is connected with the hammer head 631 and the other end is connected with the end wall of the one-way valve inlet pipe 61. When the sealing hammer 63 is forced to move by the water pressure, the hammer handle 632 can have the function of supporting the spring 64 and avoid the slight shaking of the sealing hammer 63.

In order to be adapted to the inner wall of the one-way valve inlet pipe 61, the hammer head 631, for instance, has a cylindrical structure, and the outer diameter of the hammer head 631 may be less than or equal to the inner diameter of the one-way valve inlet pipe 61.

In order to prevent the water in the one-way valve inlet pipe 61 from entering the one-way valve outlet pipe 62 when the one-way water hydraulic control valve 6 is in the off-state, an O-ring seal 65 is sleeved on an outer wall of the hammer head 631 and disposed between the outer wall of the hammer head 631 and the inner wall of the one-way valve inlet pipe 61. The arrangement of the seal 65 can also avoid severe friction when the sealing hammer 63 slides along the inner wall of the one-way valve inlet pipe 61.

For the convenient installation of the one-way water hydraulic control valve 6, both the water inlet and the water outlet of the one-way water hydraulic control valve 6 are provided with connecting threads. In this way, the water inlet of the one-way water hydraulic control valve 6 is in threaded connection with the outlet pipe, and the water outlet of the one-way water hydraulic control valve 6 is in threaded connection with the outlet pipe. Therefore, the cleaning device can be more conveniently and firmly mounted.

In the description, specific features, structures, materials or characteristics may be combined by appropriate means in any embodiment or example or a plurality of embodiments or examples.

The foregoing is only preferred embodiments of the present invention and not intended to limit the scope of protection of the present invention. Any change or replacement that may be easily thought of by those skilled in the art within the technical scope disclosed by the present invention shall fall within the scope of protection of the present invention. Therefore, the scope of protection of the present invention shall be defined by the appended claims.

The application claims priority to the Chinese patent application No. 201420549334.X, filed Sep. 23, 2014, the entire disclosure of which is incorporated herein by reference as part of the application.

The invention claimed is:

1. A cleaning device, comprising:
   a clean water tank,
   a water pump,
   a cleaning head, wherein a water outlet of the clean water tank is connected with the water pump, and a water outlet of the water pump is connected with the cleaning head through an outlet pipe,
   an outlet control switch, and
   a one-way water hydraulic control valve, wherein the outlet control switch is provided on the outlet pipe; a water inlet of the one-way water hydraulic control valve is connected with the outlet pipe, and a joint of the water inlet of the one-way water hydraulic control valve and the outlet pipe is disposed between the outlet control switch and the water pump; and a water outlet of the one-way water hydraulic control valve is communicated with a water inlet of the clean water tank;
   wherein the one-way water hydraulic control valve includes a one-way valve inlet pipe, a one-way valve outlet pipe and a sealing hammer disposed within the one-way valve inlet pipe,
   wherein the water inlet of the one-way water hydraulic control valve is disposed at one end of the one-way valve inlet pipe, and the other end of the one-way valve inlet pipe is provided with an end wall; one end of the one-way valve outlet pipe is hermetically sleeved at one end of the one-way valve inlet pipe provided with the end wall, and the other end of the one-way valve outlet pipe is provided with the water outlet of the one-way water hydraulic control valve; a cavity is formed between an outer wall of the one-way valve inlet pipe and an inner wall of the one-way valve outlet pipe; a leakage port communicated with the cavity is formed on a pipe wall of the inlet pipe; the sealing hammer is configured to slide along an inner wall of the one-way valve inlet pipe; an end surface of the sealing hammer is connected with the end wall of the one-way valve inlet pipe through a spring; and when the spring is in a free state, the sealing hammer completely seal the leakage port; and
   wherein a water leaking direction of the leakage port is perpendicular to an extending direction of the one-way valve inlet pipe.

2. The cleaning device according to claim 1, wherein the cleaning head includes a clean water outlet and a waste water collection port which is connected with a waste water pipe.

3. The cleaning device according to claim 1, wherein the water inlet of the one-way water hydraulic control valve is connected with the outlet pipe through a tee pipe coupling disposed between the outlet control switch and the water pump.

4. The cleaning device according to claim 1, wherein the sealing hammer includes a hammer head and a hammer handle; the hammer handle runs through the end wall of the one-way valve inlet pipe; a cross-sectional area of the hammer handle is less than that of the hammer head; the spring is sleeved on the hammer handle; and
   one end of the spring is connected with the hammer head and the other end thereof is connected with the end wall of the one-way valve inlet pipe.

5. The cleaning device according to claim 4, wherein the hammer head has a cylindrical structure; and an outer diameter of the hammer head is less than or equal to an inner diameter of the one-way valve inlet pipe.

6. The cleaning device according to claim 4, wherein an O-ring seal is sleeved on an outer wall of the hammer head and disposed between the outer wall of the hammer head and the inner wall of the one-way valve inlet pipe.

7. The cleaning device according to claim 1, wherein both the water inlet and the water outlet of the one-way water hydraulic control valve are provided with connecting threads.

8. The cleaning device according to claim 2, wherein the water inlet of the one-way water hydraulic control valve is connected with the outlet pipe through a tee pipe coupling disposed between the outlet control switch and the water pump.

9. The cleaning device according to claim 2, wherein the one-way water hydraulic control valve includes a one-way valve inlet pipe, a one-way valve outlet pipe and a sealing hammer disposed within the one-way valve inlet pipe.

10. The cleaning device according to claim 9, wherein the water inlet of the one-way water hydraulic control valve is disposed at one end of the one-way valve inlet pipe, and the other end of the one-way valve inlet pipe is provided with an end wall; one end of the one-way valve outlet pipe is hermetically sleeved at one end of the one-way valve inlet pipe provided with the end wall, and the other end of the one-way valve outlet pipe is provided with the water outlet of the one-way water hydraulic control valve; a cavity is formed between an outer wall of the one-way valve inlet pipe and an inner wall of the one-way valve outlet pipe; a leakage port communicated with the cavity is formed on a pipe wall of the inlet pipe; the sealing hammer is configured to slide along an inner wall of the one-way valve inlet pipe; an end surface of the sealing hammer is connected with the end wall of the one-way valve inlet pipe through a spring; and when the spring is in a free state, the sealing hammer completely seal the leakage port.

11. The cleaning device according to claim 9, wherein the sealing hammer includes a hammer head and a hammer handle; the hammer handle runs through the end wall of the one-way valve inlet pipe; a cross-sectional area of the hammer handle is less than that of the hammer head; the spring is sleeved on the hammer handle; and one end of the spring is connected with the hammer head and the other end thereof is connected with the end wall of the one-way valve inlet pipe.

12. The cleaning device according to claim 11, wherein the hammer head has a cylindrical structure; and an outer diameter of the hammer head is less than or equal to an inner diameter of the one-way valve inlet pipe.

13. The cleaning device according to claim 11, wherein an O-ring seal is sleeved on an outer wall of the hammer head and disposed between the outer wall of the hammer head and the inner wall of the one-way valve inlet pipe.

14. The cleaning device according to claim 3, wherein the one-way water hydraulic control valve includes a one-way valve inlet pipe, a one-way valve outlet pipe and a sealing hammer disposed within the one-way valve inlet pipe.

15. The cleaning device according to claim 14, wherein the water inlet of the one-way water hydraulic control valve is disposed at one end of the one-way valve inlet pipe, and the other end of the one-way valve inlet pipe is provided with an end wall; one end of the one-way valve outlet pipe is hermetically sleeved at one end of the one-way valve inlet pipe provided with the end wall, and the other end of the one-way valve outlet pipe is provided with the water outlet of the one-way water hydraulic control valve; a cavity is formed between an outer wall of the one-way valve inlet pipe and an inner wall of the one-way valve outlet pipe; a leakage port communicated with the cavity is formed on a pipe wall of the inlet pipe; the sealing hammer is configured to slide along an inner wall of the one-way valve inlet pipe; an end surface of the sealing hammer is connected with the end wall of the one-way valve inlet pipe through a spring; and when the spring is in a free state, the sealing hammer completely seal the leakage port.

16. The cleaning device according to claim 15, wherein the sealing hammer includes a hammer head and a hammer handle; the hammer handle runs through the end wall of the one-way valve inlet pipe; a cross-sectional area of the hammer handle is less than that of the hammer head; the spring is sleeved on the hammer handle; and one end of the spring is connected with the hammer head and the other end thereof is connected with the end wall of the one-way valve inlet pipe.

17. The cleaning device according to claim 16, wherein the hammer head has a cylindrical structure; and an outer diameter of the hammer head is less than or equal to an inner diameter of the one-way valve inlet pipe.

18. The cleaning device according to claim 16, wherein an O-ring seal is sleeved on an outer wall of the hammer head and disposed between the outer wall of the hammer head and the inner wall of the one-way valve inlet pipe.

\* \* \* \* \*